(12) United States Patent
Ye

(10) Patent No.: US 8,272,602 B2
(45) Date of Patent: Sep. 25, 2012

(54) STAND FOR ELECTRONIC DEVICE

(75) Inventor: Zhen-Xing Ye, Shenzhen (CN)

(73) Assignees: Hong Fu Jin Precision Industry (Shen Zhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 352 days.

(21) Appl. No.: 12/720,650

(22) Filed: Mar. 9, 2010

(65) Prior Publication Data

US 2011/0114805 A1 May 19, 2011

(30) Foreign Application Priority Data

Nov. 13, 2009 (CN) .......................... 2009 1 0309722

(51) Int. Cl.
*A47F 5/00* (2006.01)

(52) U.S. Cl. .................... 248/122.1; 248/125.8; 248/149

(58) Field of Classification Search .................. 248/121, 248/122.1, 125.9, 146, 149, 125.8, 176.1, 248/676, 446, 447, 462; 361/679.55
See application file for complete search history.

(56) References Cited

U.S. PATENT DOCUMENTS

| | | | |
|---|---|---|---|
| 5,615,856 A * | 4/1997 | Simington | 248/452 |
| 7,344,112 B2 * | 3/2008 | Nice | 248/125.1 |
| 2003/0071177 A1 * | 4/2003 | Aussiker | 248/125.8 |
| 2006/0086870 A1 * | 4/2006 | Nida | 248/176.1 |
| 2007/0034753 A1 * | 2/2007 | Lee | 248/121 |
| 2010/0294899 A1 * | 11/2010 | Page | 248/125.8 |
| 2011/0303805 A1 * | 12/2011 | Lau et al. | 248/125.8 |

* cited by examiner

*Primary Examiner* — Ramon Ramirez
(74) *Attorney, Agent, or Firm* — Altis Law Group, Inc.

(57) ABSTRACT

A stand includes a base, a supporting member and a connecting member. The supporting member is spaced from the base and comprises a supporting portion and an arm pivotally engaging with the supporting portion. The arm is rotatable towards the supporting portion. The connecting member connects the base and the supporting member. The connecting member comprises a plurality of connecting portions foldaway relative to each other.

18 Claims, 6 Drawing Sheets

STAND FOR ELECTRONIC DEVICE

BACKGROUND

Technical Field

The present disclosure relates to stands and, more particularly, to a stand of an electronic device which can be folded for facilitating packaging or transportation.

Generally, stand are used to support electronic devices such as laptops. A stand normally includes a base, a pole, and a supporting member. Opposite ends of the pole integrally connect the base to the supporting member. The supporting member is an elongated plate and supports the electronic device thereon. The pole is straight, non-rotatable, and thus incapable of to be folded or swiveled to the supporting member. However, being space consuming by design, a disused stand and/or the responsibility of packing and transporting one for a manufacturer creates tremendous inconveniences.

What is needed therefore, is a stand which can overcome the above limitations.

DETAILED DESCRIPTION

Figure 1:
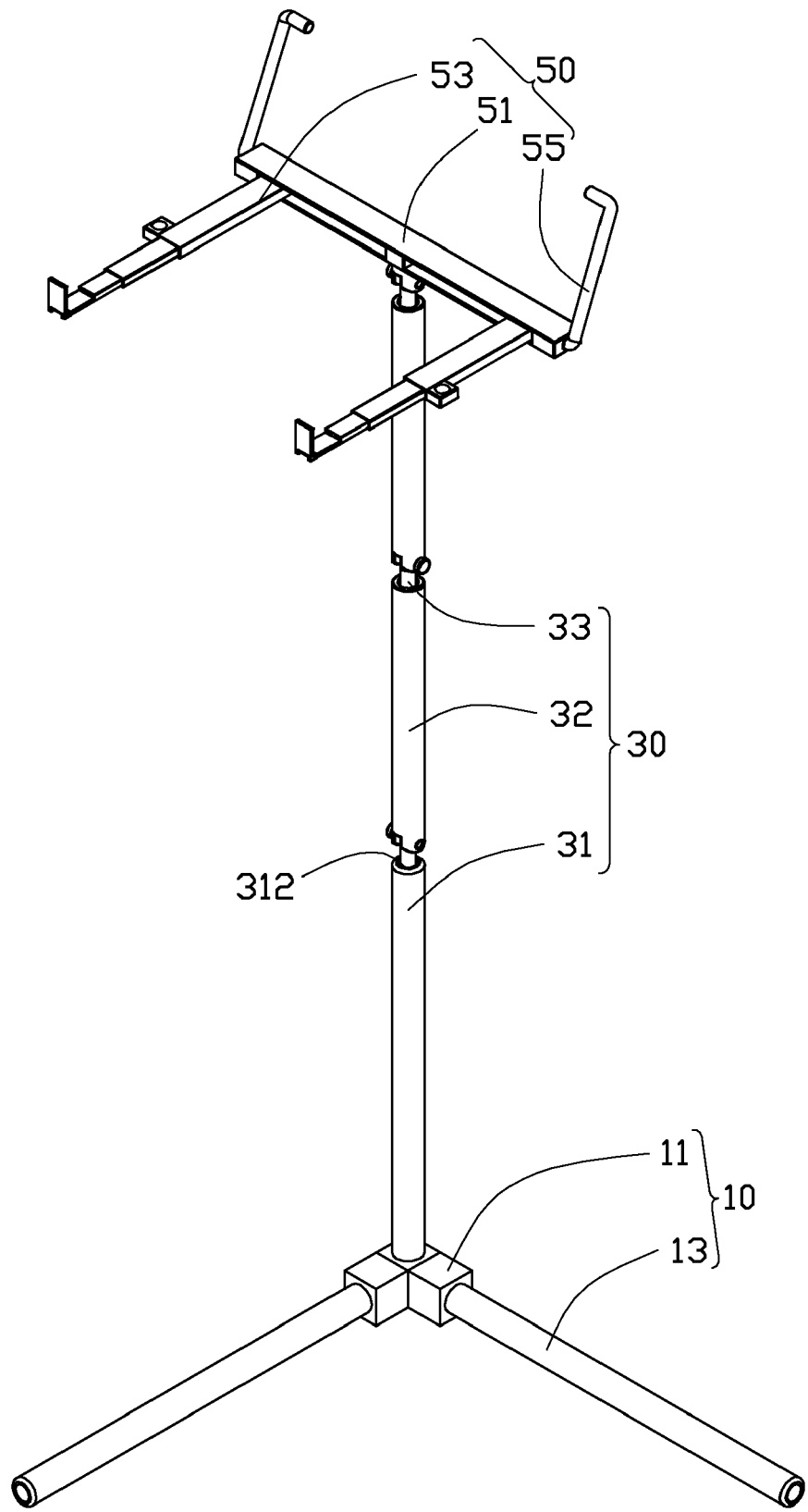
FIG. 1 is an assembled view of a stand in accordance with an embodiment of the present disclosure featuring two arms of a supporting member of the stand being unfolded.
Figure 2:
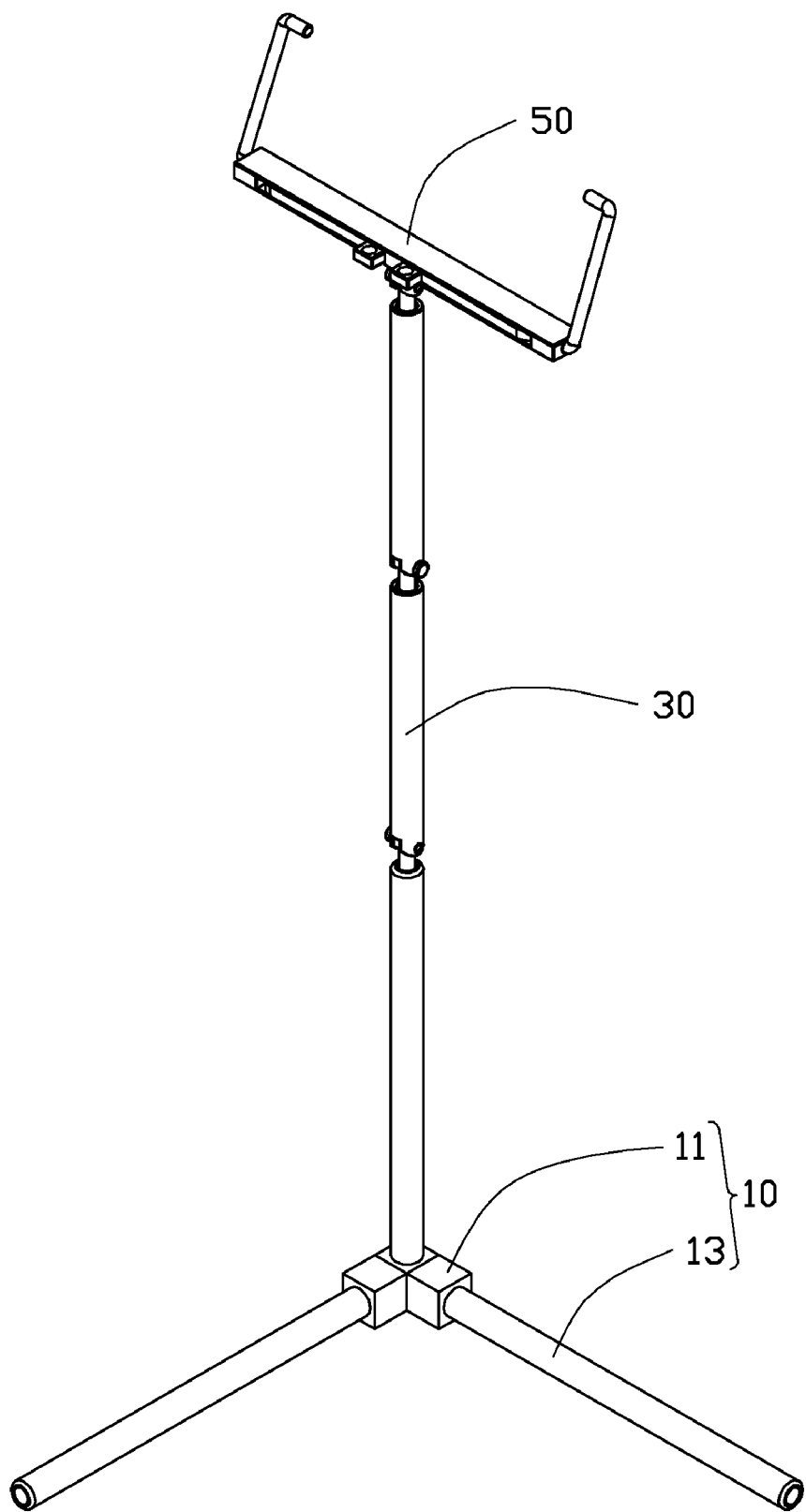
FIG. 2 is similar to FIG. 1, but with the arms being folded and received in a supporting portion of the supporting member.

FIGS. 1-2 illustrate a stand of the present disclosure. The stand includes a base 10, a supporting member 50, and a connecting member 30. Opposite ends of the connecting member 30 connect with the base 10 and the supporting member 50, respectively.

The base 10 includes a socket 11 and two cylindrical legs 13. One end of each of the legs 13 is inserted in the socket 11. The other ends of the two legs 13 are spaced from each other and oriented toward different directions. The legs 13 may be disassembled from the socket 11.

Figure 3:
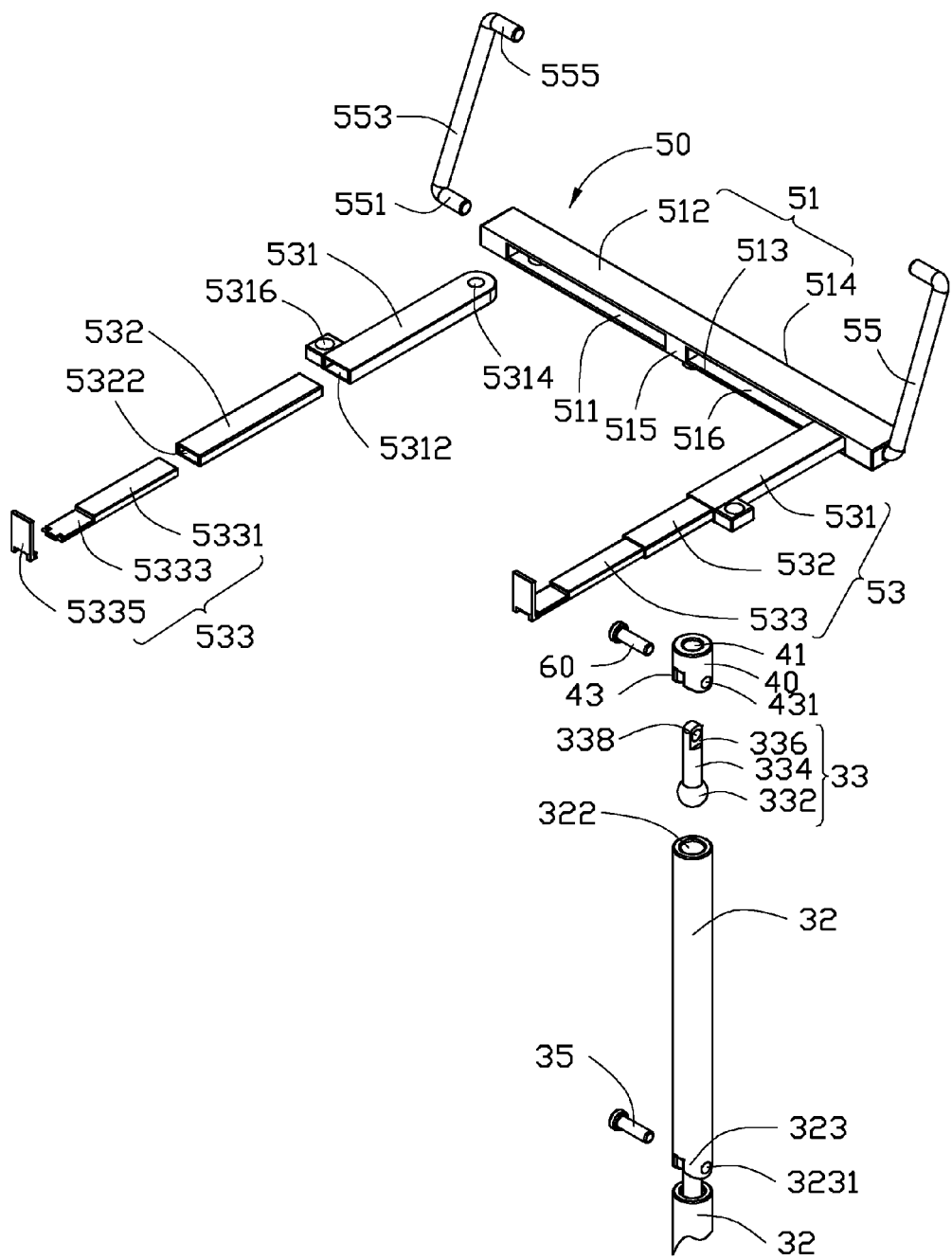
FIG. 3 is an exploded view of part of the stand of FIG. 1.
Figure 4:
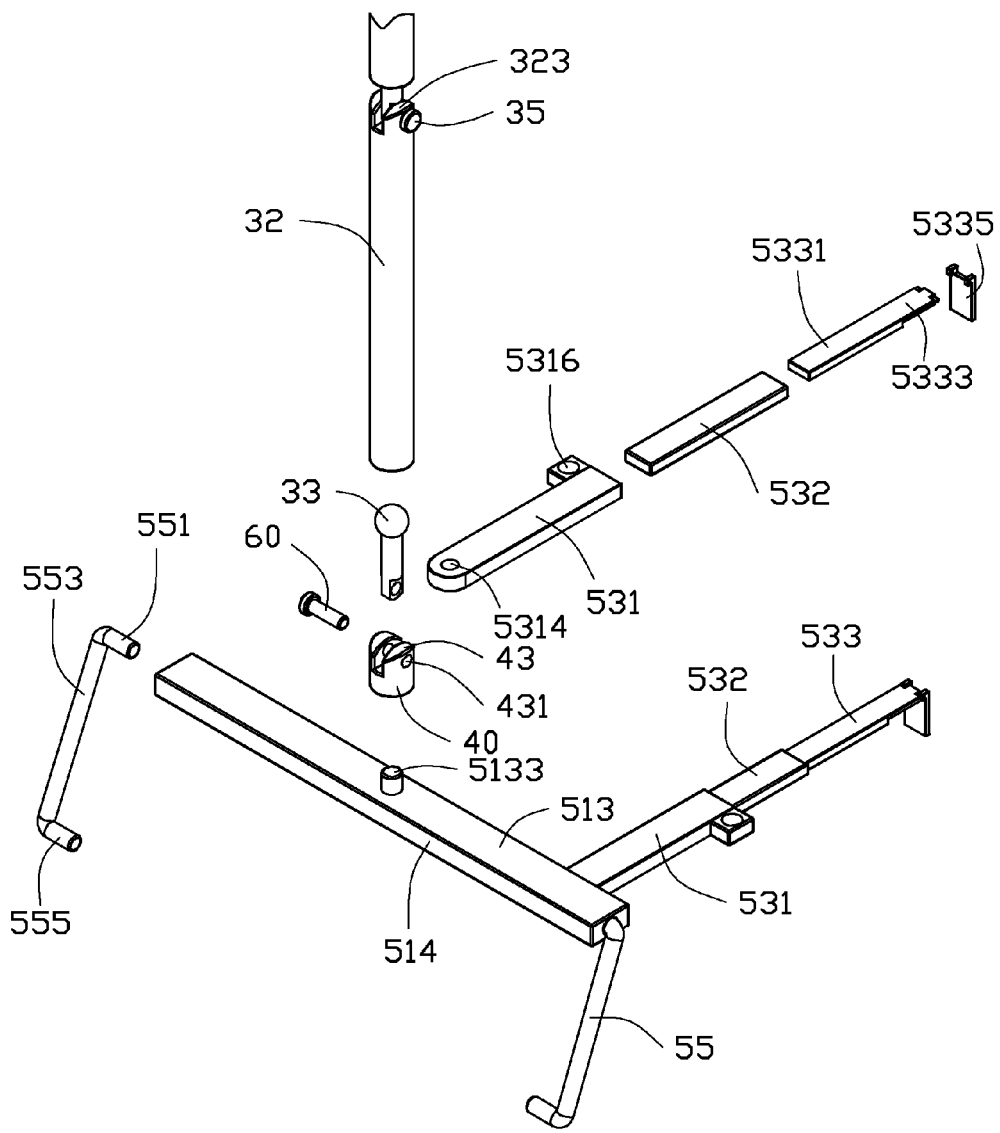
FIG. 4 is an inverted view of FIG. 3.

Referring also to FIGS. 3-4, the connecting member 30 includes a first connecting portion 31, two second connecting portions 32, and two gimbals 33 connecting with the first connecting portion 31 and the second connecting portions 32. Each of the first connecting portion 31 and the second connecting portions 32 is a cylindrical, straight pole. A bottom end of the first connecting portion 31 is inserted into the socket 11 of the base 10 to connect the base 10 to the connecting member 30. The first connecting portion 31 is substantially perpendicular to a plane defined by the two legs 13 of the base 10. A top end of the first connecting portion 31 defines a receiving hole 312 therein to receive part of a corresponding gimbal 33.

A top end of each of the second connecting portions 32 defines an engaging hole 322 therein. Two engaging portions 323 facing each other protrude from a bottom end of each of the second connecting portions 32 opposite the top end. Each of the engaging portions 323 is a protruded plate and defines a through hole 3231 at a central portion thereof.

Each of the gimbals 33 includes a global head 332, a cylindrical extending portion 334 extending from the head 332, and a linking portion 336 protruding from the extending portion 334. The linking portion 336 is rectangular and formed by cutting away portions of opposite sides of an outer end of the extending portion 334. A through hole 338 is defined at a central portion of the linking portion 336.

When the connecting member 30 is assembled, one of the gimbals 33 interconnects with the first connecting portion 31 and one of the second connecting portions 32, and the other gimbal 33 interconnects the two second connecting portions 32. The head 332 of one of the gimbals 33 is received in the receiving hole 312 of the first connecting portion 31. The linking portion 336 of the gimbal 33 is sandwiched between the engaging portions 323 of the bottom end of the second connecting portion 32. A bolt 35 extends through the through holes 3231 of the engaging portions 323 and the through hole 338 of the linking portion 336 to assemble the first connecting portion 31 and the second connecting portion 32 together. The second connecting portion 32 is rotatable around the bolt 35. Therefore, the second connecting portion 32 is foldaway-oriented towards and along a longitudinal direction of the first connecting portion 31. A diameter of the extending portion 334 is smaller than or equal to a distance between the two engaging portions 323 of each of the second connecting portions 32. Thus, the extending portion 334 and the engaging portions 323 avoid interference with each other.

The head 332 of the other gimbal 33 is received in the receiving hole 322 of the second connecting portion 32. The linking portion 336 of the gimbal 33 is sandwiched between the engaging portions 323 of the second end of other second connecting portion 32. Another bolt 35 extends through the through holes 3231 of the engaging portions 323 and the through hole 338 of the linking portion 336 to assemble the two second connecting portions 32 together. The second connecting portion 32 is rotatable around the bolt 35. Therefore, the second connecting portion 32 can fold away along the longitudinal direction of the first connecting portion 31 and oriented towards the second connecting portion 32 assembled with the first connecting portion 31.

In alternative embodiments, the connecting member 30 includes a plurality of the first connecting portions 31 and/or a plurality of the second connecting portions 32. Configuration of the first connecting portions 31 and the second connecting portions 32 may vary as long as the adjacent first and/or second connecting portions 31, 32 of the connecting member 30 is foldaway relative to each other.

The supporting member 50 includes a supporting portion 51, two arms 53, and two baffle members 55. The two arms 53 pivotally engage with the same side of the supporting portion 51. The two baffle members 55 pivotally engage with opposite ends of the supporting portion 51.

Figure 5:
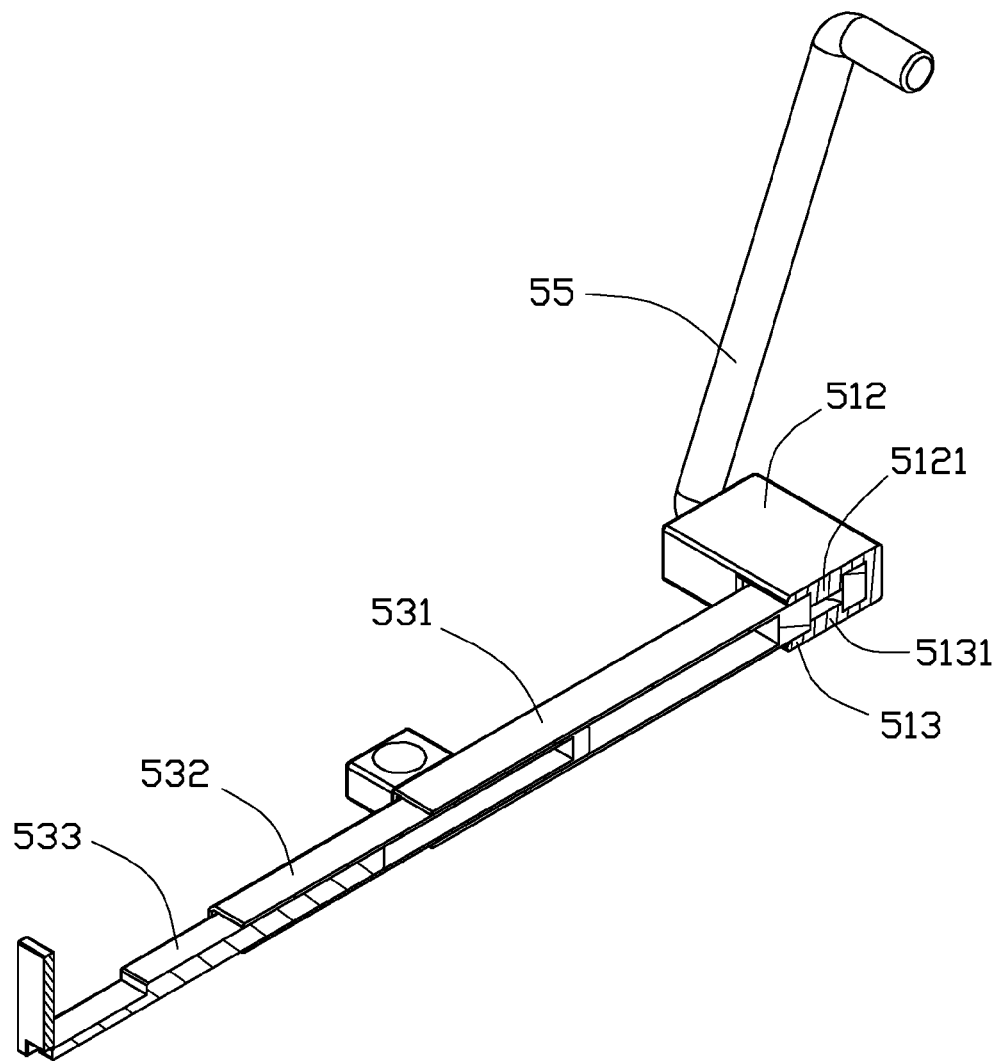
FIG. 5 is a cutaway view of the supporting member.

Referring also to FIG. 5, the supporting portion 51 is a hollow cuboid. A central portion of an elongated side of the supporting portion 51 is cutaway to define an opening 511 therein. The supporting portion 51 includes an elongated top plate 512, an elongated bottom plate 513 spaced from and parallel to the top plate 512, an elongated sidewall 514 interconnecting outer edges of the top plate 512 and the bottom plate 513. The opening 511 is opposite the sidewall 514. A supporting pole 515 is between the top plate 512 and the bottom plate 513 with opposite ends thereof adjoining the center of the inner surfaces of the top plate 512 and the bottom plate 513, respectively. Thus, the supporting pole 515 divides the supporting portion 51 into two receiving chambers 516. The two receiving chambers 516 receive the two arms 53 therein, respectively. Two protruding parts 5121 extend downwardly from opposite ends of the inner surface of the top plate 512, respectively. Two spaced protruding parts 5131 extend upwardly from opposite ends of the inner surface of the bottom plate 513, respectively, facing the protruding parts 5121. The protruding parts 5131, 5121 located at the same end of the supporting portion 51, align with each other. The arms 53 pivotably engage with the corresponding protruding parts 5121, 5131 and are rotatable around the protruding parts 5121, 5131 to be received in the receiving chambers 516. A protruding pole 5133 extends from a central portion of an outer surface of the bottom plate 513 to engage with the connecting member 30.

Each of the arms 53 includes an engaging arm 531, a connecting arm 532, and an extending arm 533. The engaging arm 531 pivotally engages with the supporting portion 51. The connecting arm 532 connects with the engaging arm 531 and the extending arm 533.

The engaging arm 531 is a hollow cuboid. The engaging arm 531 has an open end (not labeled) with an opening 5312 and a chamfered closed end (not labeled). The closed end of the engaging arm 531 defines a through hole 5314 therein. The closed end is inserted in a corresponding receiving chamber 516 of the supporting portion 51 and the protruding parts 5121, 5131 of the top plate 512 and the bottom plate 513 located at the corresponding side of the supporting portion 51 are inserted in the through hole 5314. An operating portion 5316 extends from a side of the open end of the engaging arm 531 to effortlessly operate the engaging arm 531. A width of the engaging arm 531 gradually decreases from the closed end to the open end.

Each of the connecting arm 532 is a hollow cuboid also and has an open end (not labeled) with an opening 5322 and a closed end (not labeled). A width of the connecting arm 532 gradually decreases from the closed end to the open end. A length of the connecting arm 532 is smaller than or approaches that of the engaging arm 531. The closed end of the connecting arm 532 is larger than a bore diameter of the opening 5312 of the engaging arm 531 and smaller than bore diameters of other portions of the engaging arm 531. When the closed end of the connecting arm 532 is received in the engaging arm 531, the connecting arm 532 is slidably received in the engaging arm 531. The connecting arm 532 utilizes a baffle mechanism on the engaging arm 531 to repel the connecting arm's 532 disassembly from the engaging arm 531.

Each of the extending arms 533 includes a connecting plate 5331, an extending plate 5333 integrally extending from a bottom side of the connecting plate 5331, and a baffle plate 5335 pivotally engaging with an outer end of the extending plate 5333. A width of the connecting plate 5331 gradually decreases from an inner end away from the extending plate 5333 to an outer end connecting the extending plate 5333. The height or width of inner end of the connecting plate 5331 is larger than that of the opening 5322 of the connecting arm 532 and smaller than that of other portions of the connecting arm 532 to ensure sliding of the extending arms 533 in the connecting arm 532 and prevent disengagement of them. The baffle plate 5335 is able to fold a top side of the extending plate 5333. A top surface of the baffle plate 5335 and a top surface of the connecting plate 5331 are coplanar when the baffle plate 5335 is folded. A length of the connecting plate 5331 and the extending plate 5333 in combination is not shorter than that of the connecting arm 532. The inner end of the connecting plate 5331 is inserted in the opening 5322 of the connecting arm 532 and is slidably received in the connecting arm 532.

When the supporting member 50 is assembled, the engaging arms 531, the connecting arms 532, and the extending arms 533 of the two arms 53 are assembled in series. The top plate 512 and the bottom plate 513 are operated away from each other to receive the closed ends of the two engaging arms 531 in the receiving chambers 516 of the supporting portion 51. The protruding parts 5121, 5131 of the top plate 512 and the bottom plate 513 are inserted in the through holes 5314 of the two engaging arms 531. Thus, the supporting portion 51 and the arms 53 are assembled together. Referring to FIG. 2 again, the connecting arms 532 are fully received in the engaging arms 531, and the extending arms 533 are fully received in the connecting arms 532. The operating portions 5316 of the engaging arms 531 are operated to drive the engaging arms 531 rotate around the protruding parts 5121, 5131 of the top plate 512 and the bottom plate 513 until the engaging arms 531 received in the two receiving chambers 516 of the supporting portion 51. In alternative embodiments, the arm 53 comprises the engaging arm 531 and the extending arm 533 engaging with the engaging arm 531 and is capable of being received in the engaging arm 531.

The baffle members 55 is a U-shaped pole and comprises a linking portion 551, a baffle portion 555 and a connecting portion 553 connecting the linking portion 551 and the baffle portion 555. The linking portions 551 of the two baffle members 55 pivotally connect the opposite ends of the supporting portion 51. The two baffle portions 555 of the two baffle members 55 are oriented toward each other.

A combining portion 40 engages with the protruding pole 5133 of the supporting portion 51 of the supporting member 50. The combining portion 40 is a cylindrical pole with one end thereof defining a hole 41 to receive the protruding pole 5133 and another end thereof protruding two spaced engaging plates 43 facing each other. The engaging plate 43 defines a through hole 431 therein. Another gimbal 33 connects the connecting member 30 to the supporting member 50. The head 332 of the gimbal 33 is received in the receiving hole 322 of the top end of the second connecting portion 32 which is spaced from the first connecting portion 31. The linking portion 336 of the gimbal 33 is sandwiched between the engaging plates 43 of the combining portion 40. A bolt 60 extends through the through holes 431 of the engaging plates 43 and the through hole 338 of the linking portion 336 to assemble the supporting member 50 and the connecting member 30 together.

Figure 6:
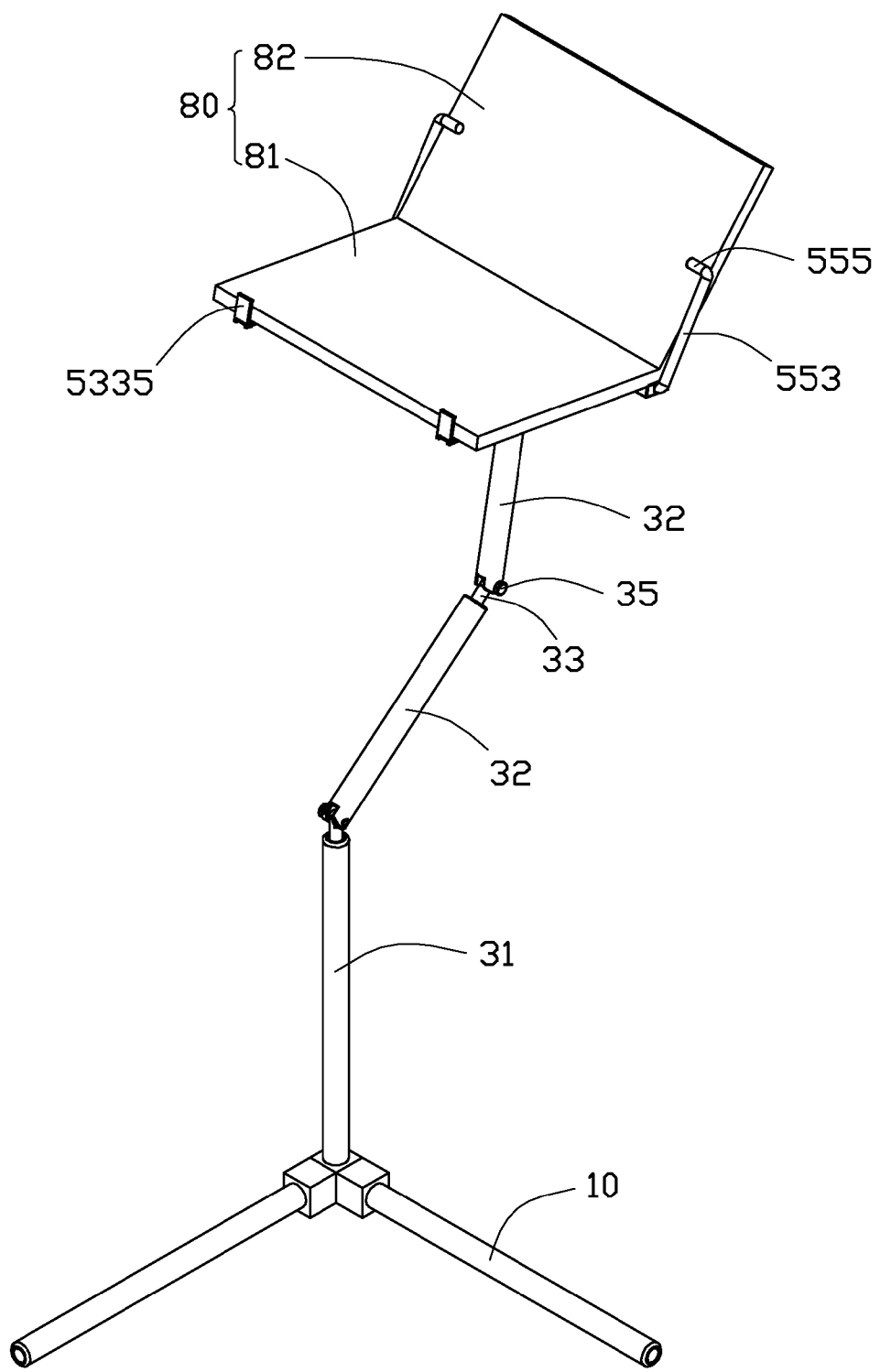
FIG. 6 shows the stand in use to support an electronic device thereon.

Referring also to FIG. 6, when the stand is in use, an electronic device 80 such as a laptop is supported by the stand. The electronic device 80 comprises a first portion 81 and a second portion 82 connecting with the first portion 81. The first portion 81 presses the top plate 512 of the supporting portion 51 of the supporting member 50, the engaging arms 531, the connecting arms 532, and the extending arms 533 of the arms 54. A side of the first portion 81 adjoins the unfolded baffle plates 5335 of the extending arms 533. The two baffle portions 555 of the two baffle members 55 adjoin opposite sides of a surface of the second portion 82 which is oriented towards the first portion 81. The second connecting portions 32 of the connecting member 30 are operated to cause the connecting portions 32 to rotate around the bolts 35, 60 to adjust a position of the electronic device 80.

When not in use, the baffle members 55 of the electronic device 80 may be disassembled from the supporting portion 51. The arms 53 are received in the receiving chambers 516 of the supporting portion 53. The supporting member 50 may be disassembled from the connecting member 30 by disassembling the bolt 60. The connecting member 30 and the legs 13 may be disassembled from the socket 11 of the base 10. The first connecting portion 31 and the second connecting portions 33 is then foldable, thereby saving space and facilitating any needed relocation of the stand.

It is to be understood, however, that even though numerous characteristics and advantages of the embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A stand comprising:
   a base;
   a supporting member spaced from the base and comprising a supporting portion and an arm pivotally engaging with the supporting portion, the arm being rotatable relative to the supporting portion;
   a connecting member connecting the base and the supporting member, the connecting member comprising a plurality of connecting portions adjoined together and foldaway relative to each other;
   wherein a receiving chamber is defined in the supporting portion for rotatably receiving the arm, and an end of the arm is engaged in the receiving chamber; and
   wherein two protruding parts are formed on the supporting portion and pivotally engage with the end of the arm.

2. The stand of claim 1, wherein the arm comprises a hollow engaging arm inserted in the receiving chamber and an extending arm scalably engaged with the engaging arm and operable to be received in the engaging arm.

3. The stand of claim 2, wherein an operating portion extends outwardly from a side of the engaging arm.

4. The stand of claim 2, wherein a baffle plate pivotally engages with an outer end of the extending arm and is able to be folded.

5. The stand of claim 4, wherein the extending arm comprises a connecting plate and an extending plate extending from a bottom side of the connecting plate, the baffle plate pivotally engages with an outer end of the extending plate and is able to fold on a top side of the extending plate.

6. The stand of claim 5, wherein the arm further comprises a connecting arm, the connecting arm is hollow and two ends thereof engage with the engaging arm and the extending arm, respectively.

7. The stand of claim 6, wherein the connecting arm is slidably received in the engaging arm, and the extending arm is slidably received in the connecting arm.

8. The stand of claim 7, wherein a width of the connecting arm gradually decreases from a closed end connected to the engaging arm to an open end connected to the extending arm, the closed end is larger than an end of the engaging arm which the closed end is engaged, and the closed end is smaller than other portions of the engaging arm.

9. The stand of claim 8, wherein a width of the connecting plate of the extending arm gradually decreases from an inner end away from the extending plate to an outer end connecting the extending plate, and the inner end of the connecting plate engages in the open end of the connecting arm.

10. The stand of claim 1, wherein two baffle members pivotally engage with two ends of the supporting portion of the supporting member.

11. The stand of claim 10, wherein each of the baffle members comprises a linking portion pivotally engaging with a corresponding end of the supporting portion, a baffle portion, and a connecting portion connecting the linking portion and the baffle portion, the two baffle portions of the two baffle members being oriented toward each other.

12. The stand of claim 1, wherein another arm pivotally engages with the supporting portion, and the two arms are symmetrical each other.

13. The stand of claim 1, wherein the base comprise a socket and two spaced legs inserted in the socket, one end of the connecting member inserted in the socket.

14. A stand comprising:
    a base;
    a supporting member spaced from the base and comprising a container with an opening thereof and two arms, two spaced protruding parts formed on inner surface of the container, the two arms pivotally engaging with the protruding parts and rotatable around the protruding parts to be received in the container; and
    a connecting member connecting the base and the supporting member, the connecting member comprising a plurality of connecting portions adjoined together and foldaway relative to each other.

15. The stand of claim 14, wherein two baffle members pivotally engage with two ends of the supporting portion of the supporting member.

16. The stand of claim 14, wherein the adjoining connecting portions of the connecting member connect each other by a gimbal and a bolt, the gimbal has a head received in an end of one connecting portion and a linking portion sandwiched in two spaced engaging portions of an end of another connecting portion, the bolt extends through the engaging portions and the linking portion, the another connecting portion is rotatable around the bolt.

17. A stand comprising:
    a base;
    a supporting member spaced from the base and comprising a supporting portion and an arm pivotally engaging with the supporting portion, the arm being rotatable relative to the supporting portion;
    a connecting member connecting the base and the supporting member, the connecting member comprising a plurality of connecting portions adjoined together and foldaway relative to each other;
    wherein the adjoining connecting portions of the connecting member connect each other by a gimbal and a bolt, the gimbal has a head received in an end of one connecting portion and a linking portion sandwiched between two spaced engaging portions of an end of another connecting portion, the bolt extends through the engaging portions and the linking portion, and the another connecting portion is rotatable around the bolt.

18. The stand of claim 17, wherein a protruding pole is formed on the supporting portion, a combining portion engages with the protruding pole and sandwiches the linking portion of one gimbal between two spaced engaging plates of the combining portion, a bolt extends through the engaging plates and the linking portion of the gimbal, the supporting portion is rotatable around the bolt, and the head of the gimbal engages with a corresponding connecting portion of the connecting member.

* * * * *